United States Patent [19]
Gross

[11] 3,842,350
[45] Oct. 15, 1974

[54] COMBINED LAND LINE AND SATELLITE COMMUNICATION SWITCHING SYSTEM

[75] Inventor: William B. Gross, Havertown, Pa.

[73] Assignee: General Electric Company, New York, N.Y.

[22] Filed: Dec. 26, 1972

[21] Appl. No.: 318,298

[52] U.S. Cl. .................... 325/4, 325/21
[51] Int. Cl. .................... H04b 7/20
[58] Field of Search .................... 325/4, 3, 5, 8–11, 325/13, 14, 15, 18, 21, 22

[56] References Cited

UNITED STATES PATENTS 3,676,778 7/1972 Mori .................... 325/4

*Primary Examiner*—Albert J. Mayer
*Attorney, Agent, or Firm*—Allen E. Amgott; Raymond H. Quist; Henry W. Kaufmann

[57] ABSTRACT

Ground terminal serving a number of individual telephone lines in a local region converts their signals to an intermediate frequency without regard to whether called station is in same local region or in remote region linked by relay satellite. Switching equipment routes remote region calls to up-frequency converter link to satellite, and local region calls to intermediate-frequency bus for connection to local region called line. Intermediate-frequency switching system thus replaces conventional combination of standard telephone exchange for local region calls plus separate switching system for ground link to relay satellite, with economy in equipment for appropriate mix of local and remote traffic.

3 Claims, 8 Drawing Figures

COMBINED LAND LINE AND SATELLITE COMMUNICATION SWITCHING SYSTEM

BACKGROUND OF THE INVENTION:

1. Field of the Invention

This invention pertains to communication switching systems with frequency conversion, and more particularly to such systems which are adapted to employment with remote relaying means such as a communication relay satellite.

2. Description of the Prior Art

While there is much prior art concerning the assignment of communications channels in a relay satellite to various calling ground stations, the applicant is not aware of any device which combines at a ground station the functions of switching calls requiring relaying by a satellite, and also calls not requiring such relaying because they are in the same local region. This is conventionally accomplished by employing a conventional telephone exchange for switching local region calls, with lines tying this exchange to a ground station specially equipped to secure access to satellite channels. While the presently conventional practice is economical in common-carrier service in which the proportion of local region calls greatly exceeds the proportion of satellite-relayed calls, when the proportion of satellite-relayed calls becomes large the conventional exchange and the satellite ground station equipment tend to require substantially equal numbers of channels, and therfore tend to constitute wasteful duplication.

SUMMARY OF THE INVENTION

Each incoming local trunk line is connected to an individual trunk unit. Each trunk unit comprises a modulator unit connected to a programmable oscillator whose frequency, determined by external control means, is suitable to convert the incoming signals from the trunk to a selected intermediate frequency; and a demodulator connected to a second programmable oscillator, whose frequency is externally determined to convert signals received at another selected intermediate frequency into outgoing signal to the trunk. The trunk unit also contains equal pluralities of receiving and of transmitting relays to make external connection to various input and output channels, respectively, to the ground station communicating with a satellite relay, and to a common intermediate-frequency channel through whose different frequency bands trunk units for local trunk lines are tied together. Each trunk units also contains an address and command decoder which receives control signals from a routing controller external to the trunk unit and converts these into signals for controlling the frequencies of the two programmable oscillators and closing the selected receiving and transmitting relays. A conventional dial register is preferably also provided.

The general station equipment not included in the trunk units comprises antenna, diplexer, transmitter and receiver means suitable for communicating with a satellite relay. Since a conventional satellite relay system comprises transponder means which provide a number of frequency-separated channels, the transmitter is fed from a number of frequency up-converters, and the receiver output is fed to a similar number of frequency down-converters. This facilitates the use of intermediate frequencies chosen for system design convenience without direct reference to the frequencies actually employed in the satellite transponder. It will be observed that the only modulation and demodulation processes which occur in the systems are performed in the individual trunk units, so that the system is not dependent upon the use of a particular modulation system. However, in order to permit the use of time-sensitive multiplexing schemes which will use the same satellite transponder frequency channel, and so use the same up- or down-converter, the input to each up-converter is through a multiple-input mixer, and the output from each down-converter is through isolating means to multiple outputs. This permits the connection of more than one trunk unit to a given converter pair, without interaction between the different trunk units. To provide similar facilities for local calls, the relay contacts in each trunk unit for handling local calls are connected to summer and isolator means which are tied together through a broadband amplifier to provide gain on local calls.

Since the embodiment thus far described is obviously intended as part of a system employing more than one ground station, the general station equipment also includes a routing controller which is connected directly to the transmitter and receiver for communication via satellite, by channels assigned particularly to such use, with a centrally located computer. The routing controller is connected by address and information busses to each trunk unit. For locally originated cells, it receives the dialed called number, interrogates the remote computer as to the available transponder channels, and, responsively to the reply received, adjusts the frequency of the two programmable oscillators in the calling trunk unit and closes the appropriate relays to connect that trunk unit to the mixer and isolator units appropriate to the selected transponder channels. Termination of call causes the routing controller to inform the remote computer of release of channel. For incoming satellite-relayed calls, the routing controller receives information from the remote computer of the number of the trunk unit being called and of the transponder channels to be used. The routing controller then causes the programmed oscillators in the appropriate trunk unit to be set to frequencies appropriate to the transponder channels being used, and cause the closing of the proper relays in the trunk unit to connect the to th summer and isolator units assigned to the proper transponder channels.

Depending upon the relative proportion of purely local calls, it is possible and may be economically desirable to provide the routing controller with facilities of its own to assign channels to be used for local calls, merely informing the remote computer that those channels are locally in use and hence not available to receive satellite-relayed calls. This additional capability in the routing controller may be controllable on and off, so that it may, for example, be turned on during periods of heavy traffic to reduce somewhat the duty of the remote computer. It has the additional advantage of permitting local operation if for any reason satellite communication should be interrupted.

DESCRIPTION OF THE PREFERRED EMBODIMENT

Figure 1:
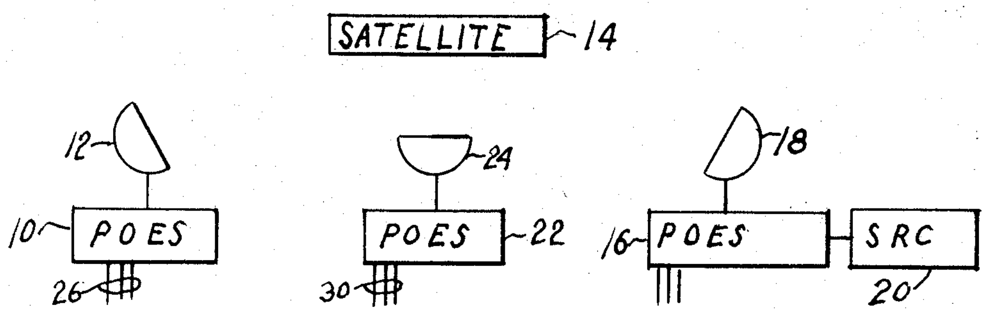
FIG. 1 represents symbolically a communication system employing my invention.

FIG. 1 represents schematically a system embodying my invention. A primary office earth station 10, provided with an antenna structure 12 beamed generally at a relay satellite 14 is placed in communication thereby with another primary office earth station 16, whose antenna structure 18 is also beamed at relay satellite 14. Because the terminology of the various components to be described is long, acronyms will be employed for certain components after the full recital of the name of the component has been given and its acronym has been given in connection therewith. Thus a primary office earth station will be designated as a POES. POES 10 and POES 16 may be substantially identical with each other, but POES 16 differs from POES 10 in having connected to it (and preferably located in immediate proximity to it) a system routing center (acronym SRC) 20. A third POES 22 having an antenna structure 24 beamed at the relay satellite 14 is also represented, for completeness, and may be identical with POES 10. In general, only one SRC 20 will be required for a system of a plurality of POES stations. Its function is to control the operation, by switching and frequency assignment, of the means embodied in each POES for interconnecting the various channels or access lines generically designated as 26, 28, and 30 and represented as connected respectively to POES 10, 16, and 22. These access lines in the embodiment to be described will be assumed to be telephone circuits, either single subscriber lines, or trunks from exchanges usually remote from the POES to which they are connected, since each POES is capable of performing the functions of an exchange for access lines connected to it. That is, two of channels 26 may be interconnected by POES 10 employing some of the same apparatus and methods which also permit a channel 26 to be connected by a radio channel via satellite 14 to another POES, e.g. 22 and to a selected channel 30. The principles of my invention may, of course, be applied to perform similar services for channels of different bandwidth by suitable adjustment of frequencies employed and band pass characteristics, but since the present need of major economic interest is for the provision of such services to telephone and similar channels my preferred embodiment is directed to these.

Figure 2:
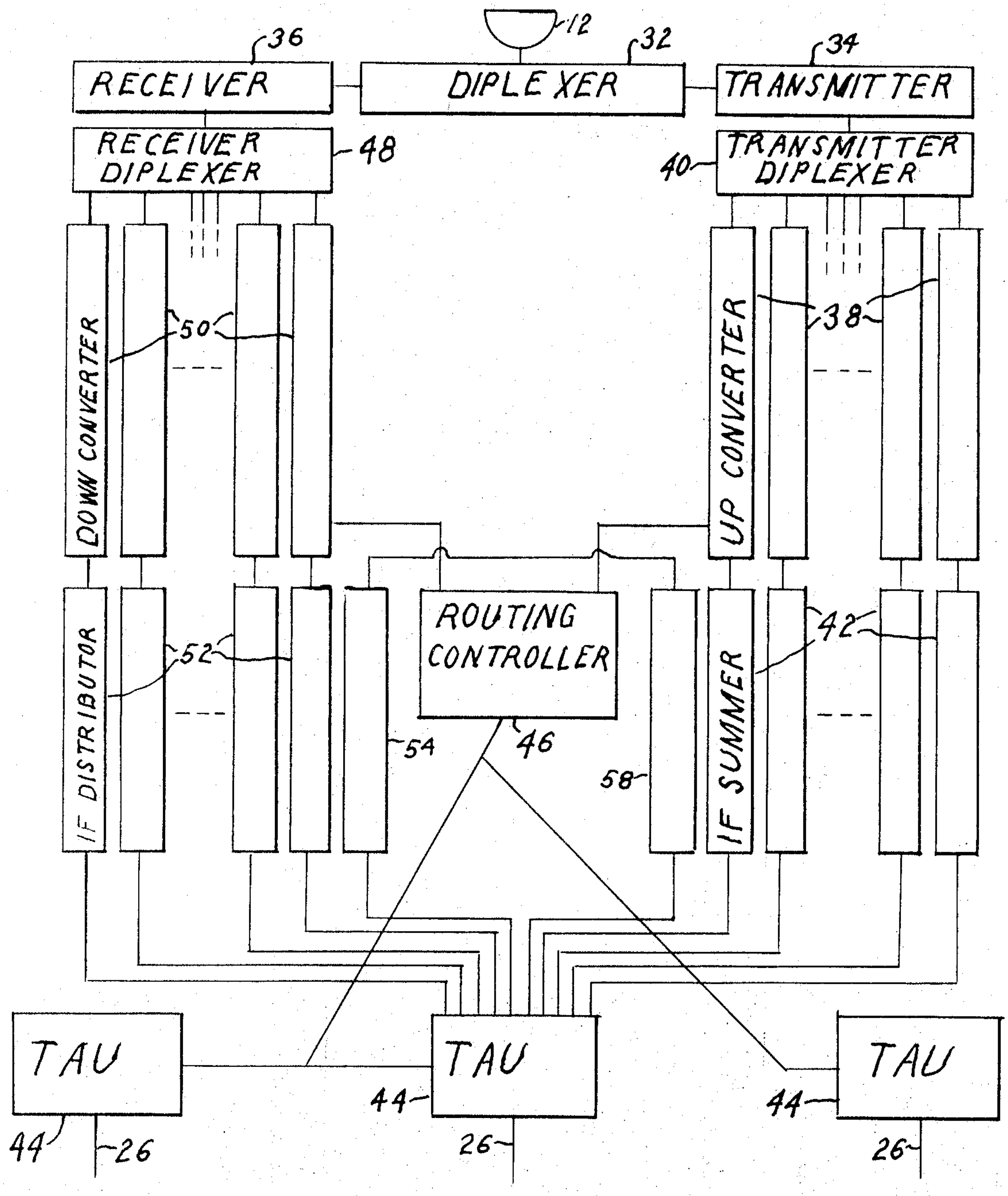
FIG. 2 represents schematically in block diagram form an entire primary office earth station according to my invention.

FIG. 2 represents in simplified block diagram form the components of a POES such as 10 of FIG. 1. A directional antenna structure, e.g. 12 is connected via a transmitter-receiver diplexer 32 to a transmitter 34 and a receiver 36. Both the transmitter 34 and the receiver 36 are of sufficient bandwidth capability to provide a plurality of audio channels and also to transmit and receive, respectively, digital control signals in addition. Their frequency coverages are, of course, appropriate to communicate with the relay receiving and transmitting systems in relay satellite 14. The transmitter 34 is in fact a power amplifier which receives signals at various frequency bands within its range from a plurality of upconverters 38, via a transmitter diplexer 40 which prevents interaction between the various upconverters 38. In a practical embodiment, transmitter 34 may have a bandwidth from 5925 to 6425 megahertz (MHz). Each upconverter 38 is designed to receive intermediate frequency signals from an intermediate frequency summer (IF summer) 42, in the range 70 ± 18 MHz, and convert them in frequency to a band centered around one of twelve center frequencies in the range from 5925 to 6425 MHz — the frequency range of transmitter 34. The bandwidth of the intermediate frequency is 36 MHz (as indicated by the ± 18 MHz), and the twelve center frequencies are separated by 40 MHz to provide an adequate guard band. Since the transmitter bandwidth is 500 MHz (6425 MHz − 5925 MHz), there is room for twelve center frequencies spaced by 40 MHz, a total of 480 MHz, with 10 MHz guard bands at each end of the spectrum. In accordance with the well known art, filters are provided in the various components of the system to suppress any signals or harmonics thereof which lie outside of the band desired in any given case, and will not be specifically mentioned in descriptions of such components.

Obviously, a maximum of twelve upconverters 38 will be usable simultaneously in the particular embodiment described, one for each permissible center frequency; but a smaller number may be provided for a particular POES which is intended to handle less than the maximum permissible traffic to satellite 14.

Each upconverter 38 is fed signals in the IF band described from an intermediate frequency summer (IF summer) 42, which has a plurality of input terminals to receive simultaneously a plurality of different signals lying in the IF band 70 ± 18 MHz. The primary function of the IF summer 42 is simply the linear addition of the plurality of signals applied to its input terminals (which will ordinarily be suitably separated in frequency within the IF band), with suppression of any interaction between the different signals, and filtering of any harmonics or other signals outside of the proper band of each. While each IF summer 42 is represented as a single unit, it may in fact be composed of a cascade of summers; that is, first-level summers may each sum e.g. ten signals and feed their outputs to a second-level summer which will add the various sums of ten signals each to produce either a subtotal to be further added by a third-level summer, or an output which is itself a grand total to be applied directly to an upconverter 38.

In any such case, the totality of all levels of summers is itself no more than an IF summer, and the representation 42 is so to be understood.

To recapitulate in somewhat colloquial terms what has been described thus far, each IF summer 42 receives a plurality of signals suitably separated from each other in the IF band. The IF summer 42 then applies these summed frequency-separated signals to an upconverter 38, which translates the composite spectrum of summed signals to one of twelve center frequencies in the transmitting band. Twelve upconverters 38, each translating to a different one of the twelve center frequencies apply their outputs to the input of transmitter 34, which produces an output comprising all the incoming signals, each separated in frequency from all other signals, spread in frequency over the transmitting band of the transmitter 34. If the center frequencies of the upconverters 38 are fixed (as is in fact contemplated) the selection of a particular one of the multiplicity of signal channels described depends upon the particular IF summer 42 to which the incoming signal is applied, and the particular channel in the IF spectrum ($70 \pm 18$ MHz) at which the incoming signal is provided to its IF summer 42. The mechanism of such selection will now be discussed.

Figure 3:
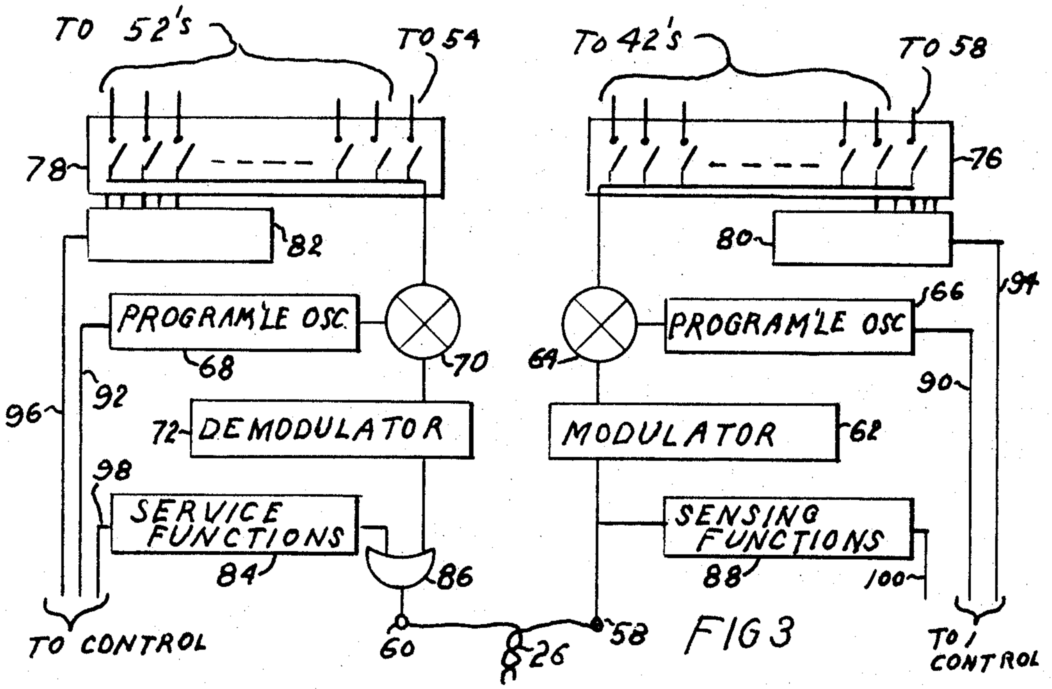
FIG. 3 represents schematically in block diagram form a trunk access unit, reference number 44 of FIG. 2.

Each access line (e.g. 26, 28, 30 of FIG. 1) coming to the POES, which will ordinarily be an individual subscriber line or a trunk line from a remote exchange, is provided with a trunk access unit (TAU) 44, represented in more detail in schematic block diagram form in FIG. 3. Since the subscriber or trunk access lines 26 may often be provided by common carrier public utilities, and may differ in system characteristics such as signaling conventions, it is recognized that interconnection devices may be provided between the channel and the TAU 44 to provide compatibility between the two. Such devices are available through the utility company, and form no part of my invention; their existence and use are mentioned merely for completeness of disclosure.

An important function of the TAU 44 is to receive a voice signal from an incoming channel and to modulate by that voice signal a carrier in a particular channel in the IF range, the carrier frequency being selected in accordance with control or instruction signals received via a routing controller (RC) 46. The modulated IF output is then connected by a summer select switch 76 to an input to an IF summer 42. A similar cognate function of the TAU is to receive a modulated IF signal, demodulate it, and provide the demodulated signal to the incoming channel. In the performance of this cognate function the TAU receives a plurality of IF signals and, by generating an appropriate local oscillator frequency responsively to control or instruction signals, it selects the particular IF signal destined for it. The TAU also contains some control equipment required for the performance of its essential functions.

Before continuing with a detailed description of the TAU, it is desirable to take up the receiving functions of the POES which result in the presentation of an IF signal to the TAU for demodulation. The POES receiver 36 receives incoming signals from satellite 14 via antenna structure 12 and transmitter-receiver diplexer 32. Its frequency coverage corresponds to the frequency band employed by the relay transmitter in the satellite 14, and in a particular embodiment may have the frequency range 3700 to 4200 MHz. Analogously with the transmitter 34, it functions simply as an amplifier of signals in this range, and provides as an output signals in this frequency range amplified but unchanged in frequency to a receiver diplexer 48, which in turn provides these amplified signals to a plurality of downconverters 50. Each of these downconverters 50 receives a separate portion of the 500 MHz spectrum of signals received by receiver 36. In strict analogy with the adjacent non-overlapping frequency coverage of the upconverters 38, the down-converters 50 in the preferred embodiment will be twelve in number and will cover the 500 MHz spectrum of received signals with appropriate guard band separation. Each downconverter 50 is thus a frequency converter which converts its 40 MHz nominal portion of the 3700 to 4200 MHz spectrum to an intermediate frequency $70 \pm 18$ MHZ with guard bands. This 36 MHz IF range contains a plurality of individual modulated signals exactly as does the output of an IF summer 42 in the transmitting portion of the POES. The output of each downconverter 50 is connected to an intermediate frequency distributor 52, which is provided with a plurality of outputs to each of which the receiving portion of a TAU may be connected by a distributor select switch 78, without interaction between the various TAUs. The TAU, as has already been generally described, by setting its local oscillator to an appropriate frequency, responsively to control signals, selects the particular IF signal in the 500 MHz band existing at the output of the IF isolator 52 to which it is connected and demodulates it and provides the demodulated signal to the access line 26 that it serves.

An advantage of employing the same IF range both for IF signals transmitted from the TAUs and IF signals received by the TAUs is that substantially the same selection equipment which routes signals between a given TAU and the satellite 14 may be employed to interconnect two TAUs at the same POES. Thus the POES performs the dual functions of switching satellite-relayed calls and of acting as a local telephone exchange. This results in desirable economy of equipment, and is a valuable feature of my invention.

To this end I provide an IF distributor 54 connected by a channel 56 to an IF summer 58, channel 56 being of bandwidth capabilities suitable to pass the entire IF spectrum. IF distributor 54 may be identical with the other IF distributors 52, but is separately identified because of its particular function. Similarly, IF summer 58 may be identical to its cognates 42. When a TAU 44 is connected by its switching means to 54 and 58, it may be connected to any other TAU so connected, the full IF spectrum being available for channel selection precisely as is the case for connection to one of 52 and one of 42. If the local traffic (that is, between access lines to the same POES) is so great that the channels available in the IF spectrum are insufficient, duplicates of 54, 56, and 58 may be provided. This is obviously a matter of design for a particular installation. It should be observed that the provision of 54, 56, and 58 enables the POES to perform the functions of a conventional telephone exchange at a very small additional cost of apparatus.

FIG. 3 represents schematically a single TAU. Access line terminal 58 represents the incoming signal terminal of an access line 26, and access line terminal 60 represents the outgoing signal terminal of the same access line 26, suitable connecting apparatus of the standard type available from common carrier telephone companies being assumed inserted, if necessary, between the TAU terminals and the actual access line to provide the indicated separation of functions. In the particular embodiment envisaged delta or incremental modulation is employed, so that a modulator 62 is represented connected to a balanced modulator 64 whose other input is from a programmable oscillator 66. The modulator 62 in the preferred embodiment will be a so-called delta modulator, known in the art, which converts amplitude-varying signals into a series of time-spaced digital signals which indicate whether the amplitude, during a preceding sampling period, has increased by at least a predetermined quantum, or decreased by such an amount, or has not changed by so much. While this is my preference, it is not essential to my invention. What my invention requires is a transmitting intermediate frequency means to receive signals from an access line and convert them to modulated signals at an intermediate frequency — in other words, a source of oscillations of proper frequency and means for modulating them with the incoming signals from its associated access line. Items 58, 62, 64, and 66 furnish this in my preferred embodiment. Compatibly with this, there are also represented a programmable oscillator 68, a balanced modulator 70 to which the oscillator 68 is connected, and a demodulator 72. Incoming intermediate-frequency signals, delta-modulated, coming via channel 74 to balanced modulator 70, are converted to signals similar to the output of modulator 62 — that is, binary coded signals — and are demodulated by delta demodulator 72 into amplitude varying signals which are fed to terminal 60 for transmission to the access line. Here, too, the requirements of my invention are for receiving intermediate frequency means to receive a modulated intermediate frequency signal and demodulate it to recover its signal content and transmit the demodulated signal to the associated access line. References 68, 70, and 72, with the help of reference 60, perform this function. But if the intermediate frequency signals on channel 74 were conventional amplitude-modulated double-sideband with carrier, the generic function would be performed by a conventional superheterodyne receiver whose local oscillator would be programmable in frequency, and whose second detector would be the specific demodulation means.

Since the intermediate frequency means, both transmitting and receiving, must be capable of being connected, respectively, to any one of IF summers 42 and 58 and to any one of IF distributors 52 and 54, there are provided for these purposes summer select switch 76 and distributor select switch 78. While these are described as, and are functionally, switches, in my preferred embodiment they are a plurality of semiconductor gates, of which only one is enabled or opened at a time to make the desired connection. The summer select switch 76 has as many output terminals as there are IF summers 42 and 58, each such output being connected to an input of a different IF summer. Similarly, the distributor select switch 78 has as many input terminals as there are IF distributors 52 and 54, each such input being connected to an output of a different IF distributor. The gates of selector switches 76 and 78 are controlled in conventional fashion by register-function table combinations 80 and 82, respectively. When a given coded selection address is set up in the register portion of 80 or 82, the function table portion thereof decodes the selection address to apply to the gates of its associated selector switch 76 or 78 proper potentials to close all the unselected gates of the selector switch and to open the selected gate, thereby accomplishing the switching function to connect the TAU to the proper IF summer and IF distributor. This use of registers, function tables, and gates is completely conventional. It would, of course, be well within the scope of the known art to employ coded signals to control the opening and closing of mechanical relays, or the rotation of a mechanical switch, but these methods are not preferred in the general application, although possible if desired for some special purpose. The register-function table combinations 80 and 82 are preferably so designed that a signal may be applied to a clearing terminal which will set the registers to a cleared state, usually designated as "zero," in which the function tables open all the gates of their associated selector switches 76 or 78, although it would be possible to clear them alternatively by entering a series of zeroes into them.

Since it is necessary to provide various conventional service functions, such as ringing and busy signals, howler for a prolonged offhook conditions, and dialing or touchtone signals, to terminal 60, a rectangle marked "service functions" 84 is represented connected via a buffer or "or" 86 to terminal 60 jointly with the connection of demodulator 72 thereto. The provision of all these conventional service functions is old in the telephone art. Similarly, it is necessary that offhook condition and other nonvoice signals be sensed via terminal 58; and a rectangle marked "sensing functions" 88 is represented connected to terminal 58. Control channels from references 66, 68, 80, 82, and 84, numbered respectively 90, 92, 94, 96, and 98 are shown collected at the bottom of the figure marked "To Control," shown in FIG. 5. A line 100 is similarly represented running from reference 88.

The control functions to be performed via channels 90, 92, 94, 96 and 98 are commanded by the SRC 20 via RC 46 and the control circuitry of a TAU 44. RC 46 serves a number of TAUs, primarily because certain functions, such as recognition of a message from SRC 20, identification of its POES address, and the like may economically be performed by a single RC for a plurality of TAUs. Identification of a TAU address could be performed by an RC which had separate lines to each TAU; and, indeed, orders addressed to a given TAU could be decoded and transmitted over such separate lines to the various registers or other functional components of the TAU, leaving substantially no command logic in the TAU itself. Alternatively, identification of a POES address could be left to each TAU; but this, as has been indicated, is also not generally economical. THe description of the "down-link" (i.e. from SRC 20) logic of RC 46 and TAU 44 will be essentially functional since the particular embodiment employed will be determined by the economic situation created by the traffic density as a function of time and service standards and also by such nontechnical considerations as the desirability of maximizing the use of simple standardized units which, while technologically wasteful of components, may be economical because they are so cheaply produced because of their simplicity and standardization. Obviously, under these conditions, my embodiment as such cannot be preferred for all purposes;

but as an example in connection with the homilies of this paragraph, it serves as such.

Figure 4:
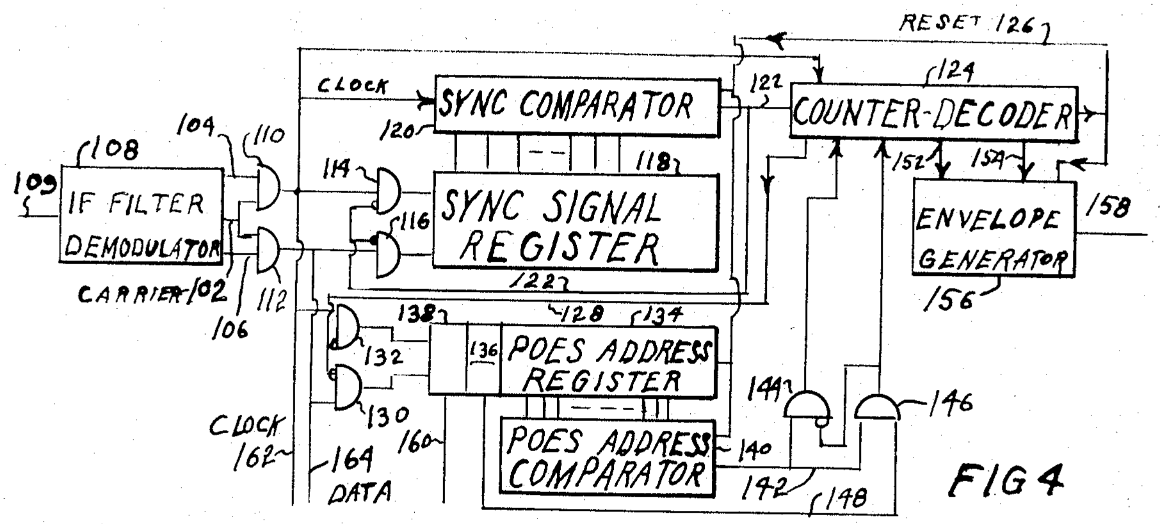
FIG. 4 represents schematically in block diagram form the down-link or receiving functions of the routing controller, reference number 46 of FIG. 2.
Figure 5:
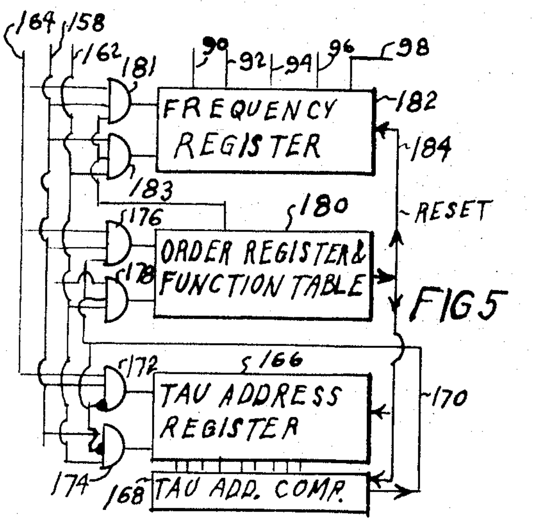
FIG. 5 represents schematically in block diagram form the down-link control logic means suitable for incorporation in a trunk access unit, reference number 44 of FIG. 2, to cooperate with the functioning of the embodiment represented in FIG. 4.

FIGS. 4 and 5 represent, for the reasons given, the down-link control portion of the RC 46 and of a TAU 44. In FIG. 4, three channels 102, 104, and 106 are represented coming from a rectangle 108 marked simply "IF filter-demodulator," which has an input channel 109 which is connected to the downconverter 50 of FIG. 2. It, as represented, comprises a filter to select the particular IF band corresponding to the channel dedicated to communication between RC 46 and SRC 20; and a demodulator to demodulate the signals in that channel. These signals preferably comprise clock or timing pulses, and digital data signals. Channel 102, marked "carrier" transmits an enabling signal which indicates that signals are actually being received, i.e. that the SRC 20 is actually transmitting to the RCs of the system. This may be derived by integrating the demodulated clock pulses, or may be transmitted as a separate signal. It enables gates 110 and 112 only when such transmission is occurring and so excludes any transient noise occurring in the absence of such transmission. Clock signals appearing on channel 104 are gated by gate 110, and data signals appearing on channel 106 are gated by gate 112. The outputs of gates 110 and 112 are fed via gates 114 and 116 to synchronizing signal register 118, which is connected to a synchronizing signal comparator 120. As a precaution to surely identify the POES address portion of a transmission from SRC 20, each such transmission is begun by a characteristic synchronizing signal deliberately chosen to differ from any data signals which can occur in the body of data in the "text" of such a transmission. Most simply, this synchronizing signal may be a series of ones of such length that any "text" signal will necessarily (because of the coding scheme chosen) have some zeroes appearing in a series of bits of equal length. It is followed by the address of the particular POES. Register 118 and comparator 120 are active — i.e. arrays of bistable active elements — so that when there has been shifted into register 118 via gates 114 and 116 a proper synchronizing signal, comparator 120 (whose functioning is timed by clock signals via gate 110) will produce an output at channel 122. This will inhibit gates 114 and 116, stopping the flow of subsequent digits into register 118 so that the proper synchronizing signal is kept stored in 118, and comparator 120 continues to produce an output at channel 122. Channel 122 is also connected to counter/decoder 124, which is also fed clock signals via gate 110. Counter/decoder 124 may conveniently be an active shift register whose input is provided by channel 122. In the absence of any signal on channel 122, counter/decoder 124 will automatically clear itself by shifting zeroes along its chain. When comparator 120 provides a signal on channel 122, the register fills with ones at a rate determined by the clock. Counter 124 is made long enough to contain as many bits as there are in an SRC message without synchronizing signal, so that when it is filled and ones appear on its output channel 126, channel 126 may be caused to furnish reset signals to register 118 and comparator 120. Interim timing signals may be derived from 124 by tapping off signals from its various stages, and buffing or gating these together, if necessary, according to requirements. The first such signals in point of time appear on channel 128 to enable data gate 130 and clock gate 132 at the proper time to enter the POES address into register 134, a single bit into a register 136 to indicate whether the message being sent is a frequency assignment or a different kind of command, and another bit into a register 138 whose presence or absence will serve as a read-out command. When this has occurred, counter/decoder 124 closes gates 130 and 132. POES address register 134 is connected to POES address comparator 140. Comparator 140, if the POES address stored in register 134 is that of the station (which is permanently wired into the comparator-register by the particular connection scheme between 134 and 140), produces a signal at its output channel 142, which is an input to gates 144 and 146. Channel 148, an output of register 136, enters gate 146, whose output is an inhibition of gate 144. Thus, if there is an output from POES address comparator 140 (i.e., if the incoming message is addressed to the POES under consideration) there will be an output from gate 144 or from gate 146, according as the bit in register 136 is a zero or a one. Counter/decoder 124 has outputs 152 and 154 to envelope generator 156. Envelope generator 156 is merely a source of a continuous gating voltage on channel 158 which is turned on by a signal on channel 152 and off by a signal on channel 154. It is distributed to all the TAUs served by the given RC and gates clock and data signals into the TAUs. This is necessary because clock and data signals from gates 110 and 112 are also transmitted to all the TAUs. The outputs from gates 144 and 146 are inputs to two different gates in counter/decoder 124. An output from one gate causes the generation of an envelope timed suitably for gating frequency assignments, and from the other causes the generation of an envelope timed suitably for gating other types of messages. In the absence of any output from one of the gates 144 or 146 (caused by lack of output from POES address comparator 140 because the message was not addressed to the POES under consideration) no envelope will be generated — which exemplifies how TAUs are kept from responding to messages addressed to another POES. As a redundant protection against the envelope generator 156 continuing turned on at the end of a message, reset channel 126 of counter/decoder 124, which generates its signal when the initial pulse started by the enabling signal on channel 122 from comparator 120 reaches the final stage of counter/decoder 124, resets envelope generator 156, as well as comparators 120 and 140 and registers 118 and 134–136–138. It also clears itself and so restores the entire apparatus of FIG. 4 to its pristine condition.

Figure 6:
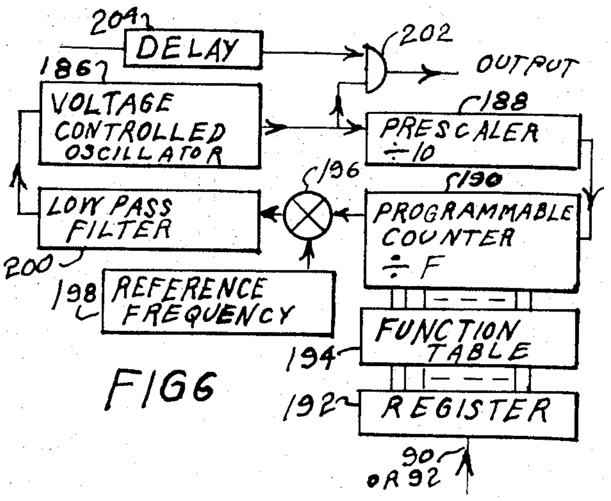
FIG. 6 represents schematically in block diagram form controllably adjustable oscillator means suitable for use as a programmable oscillator, reference number 68 or number 166, of FIG. 3.

FIG. 5 represents schematically the down-link function means which may reasonably be incorporated in the TAU 44 logic. It is first necessary that the TAU 44 identify its own address, for which a TAU address register 166 connected to a TAU address comparator 168 is provided. The output channel 170 of comparator 168 indicates that the TAU address register 166 contains the address of its particular TAU, and operates to inhibit the clock and data input gates 172 and 174. It also enables gates 176 and 178 of order register and function table 180, which then receives clock and data signals via channels 162 and 164, in the presence of envelope signal on channel 158, and decodes the instruction following the TAU address and, if it is a frequency assignment, feeds the frequency data (via gates 181 and 183) to frequency register 182 and thence via channels 90, 92, 94 and 96 to set the registers of the appropriate channel select switches and programmable oscillators. If the order is not a frequency assignment, via channel 98 it is transmitted to 84 service functions, representing the register-function table combination plus ancillary equipment for performing the various functions previously described. Order register and function table 180, when the entire message has been received, provides a reset signal at channel 182 which resets references 166, 170, 180, 182 and itself to zero. It should be observed that this resetting will not cancel the orders delivered by the message; switches 76 and 78, for example (and programmable oscillators 66 and 68 as described hereinafter with respect to FIG. 6) have thier own registers such as 80 and 82 in which their orders are stored and remain so long as the orders are in force, despite the resetting operation just described. If registers such as 80 and 82 are to be cleared, this may be done by a separate command from the SRC via the RC 46; or a general "disconnect" order may be caused to generate a reset signal which may be fed to all appropriate registers.

It must be borne in mind that the channels from the RC portion of FIG. 4 are busses common to all the TAUs served by the given RC, which is the reason why the TAU address must first be recognized by the addressed TAU before the following bits are permitted to operate in that TAU. It would be perfectly feasible to provide the RC of FIG. 4 with a decoding and gating system to decode the TAU address and then gate appropriate signals via connections individual to each TAU. It would merely not, probably, be economical While the controllably adjustable oscillator means provided in each TAU are known in the art, and form no part of my invention, for completeness such an oscillator is represented schematically in FIG. 6. The output of a voltage-controlled oscillator 186 is connected to a "prescaler" 188 which is a counter which divides the output of voltage-controlled oscillator 186 (VCO) by ten. This output is then applied to a programmable counter 190 which further counts down or divides by a factor F which may range from 866 to 1466, the factor being determined by the content of a register 192 in which the control word that determines the desired frequency is stored. This is accomplished by decoding the register 192 output through a function table 194 which operates a system of gates which determine the particular setting of programmable counter 190 which will produce a reset pulse that is applied to reset programmable counter 190 to zero. The reset pulse, since it occurs each time the programmable counter 190 has performed its commanded division, is also the output of the counter as programmed by the content of register 192. Consequently it has a frequency of 1/10 F of the actual frequency of VCO 186. This frequency is applied to a phase detector 196 whose other input is a stable reference frequency 198, which, for the transmitting IF conversion, may be locally generated at the POES, but for the receiving IF conversion may preferably be derived from a reference in the received signal. (Common reference frequencies may be generated in apparatus auxiliary to the data processing equipment, or may be derived from received signals, according to the system designers' preference in assuring compatibility between two separated but cooperating equipments, such as a transmitter and a receiver both of which perform frequency conversions.) The output of phase detector 196 is applied, through a low-pass filter 200, useful to remove unwanted high-frequency components, to the control terminal of VCO 186, in conventional phase-locked-loop fashion. In the preferred embodiment the reference frequency is 6.0 kHz; and the VCO 186 is stabilized at a frequency such that when divided by ten by prescaler 188, and by the programmed countdown, or dividing ratio F of programmable counter 190, it is equal to 6.0 kHz. This causes successive unit changes in the setting of programmable counter 190 to shift the stable frequency of VCO 186 by 60 kHz, since (inverting the process described as division) its output frequency is 6.0 kHz × 10 × prescaler factor F. In the embodiment described, the prescaler factor F ranges from 866 to 1466, a range of 600 in F, corresponding to a range of 36 MHz over which any one of 600 separate frequencies may be produced, from 51.96 MHz to 87.96 MHz. A gate 202 is provided, at the output of the VCO 186, which is fed an enabling signal via a delay 204. The enabling signal may be provided by a bistable circuit which is turned on by a control signal. The object of the delayed gating of the VCO output is the suppression of the varying frequency output which will be produced before the oscillator has become stabilized via the loop described. To permit this to be applied to the modulator 62 would cause the modulator to sweep across a number of other IF transmitting channels, with resultant crosstalk. Other methods of delay are possible, such as a bridge-type rectifier with its bipolar terminals connected across the oscillator output and its other terminals connected to a resistive-capacitive combination which will initially cause the rectifier to present substantially a short circuit, which will be increased in impedance as the capacitor in the load circuit becomes charged. The required function is simply delay of output until frequency is stabilized. An obvious alternative is to use a first command message to set up the frequency commands in the register 192 and then send a second command message to enable gate 202, in which case delay 204 is obviously superfluous. The choice is one of system design rather than invention.

Figure 8:
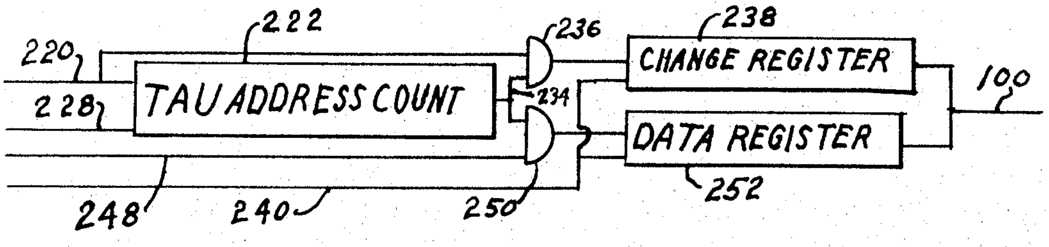
FIG. 8 represents schematically in block diagram form the up-link control logic means suitable for incorporation in a trunk access unit, reference number 44 of FIG. 2. to cooperate with the functioning of the embodiment represented in FIG. 7.

The down-link portion of RC 46 has been described; functionally RC 46 comprises both a donw-link portion and an up-link portion for transmitting data from any TAU via satellite link (in the general case) to the POES which includes the system routing controller (SRC 20). The functioning of the up-link portion of RC 46 is represented schematically in FIG. 7, and the corresponding logic of a TAU 44 is similarly represented in FIG. 8. Since the functioning of these two is intimately interrelated, their description will be provided to some extent in parallel.

Figure 7:
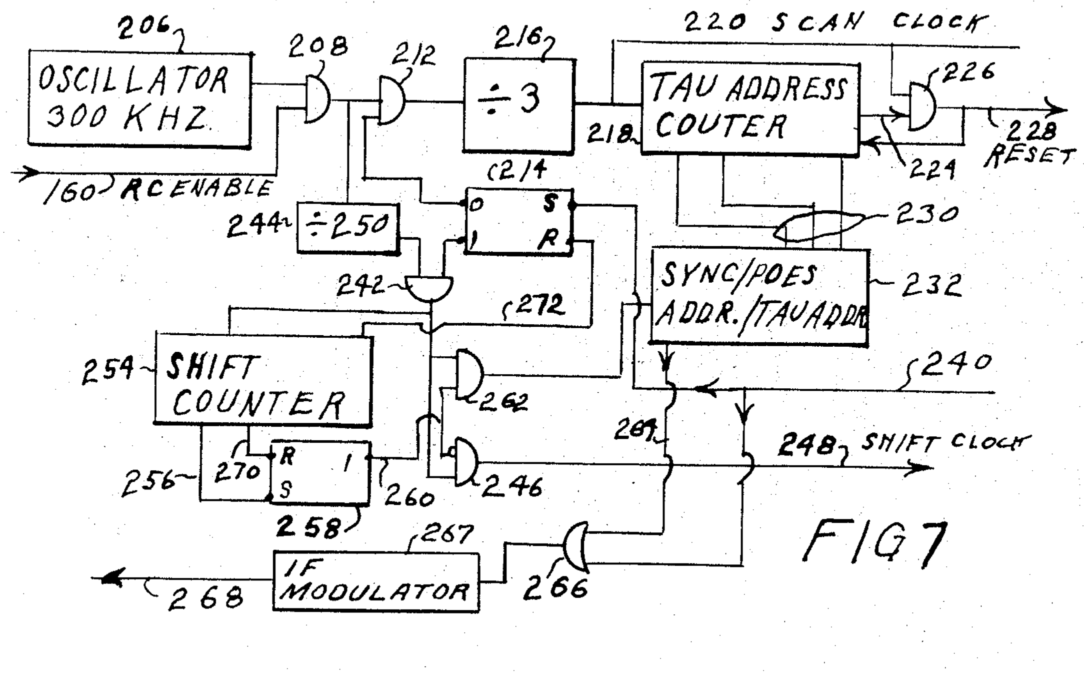
FIG. 7 represents schematically in block diagram form the up-link or transmitting functions of the routing controller, reference number 46 of FIG. 2.

Referring first to FIG. 7, a timing oscillator 206 (in a particular embodiment operating at 300 kHz) is gated through gate 208 with an enabling signal via channel 160 which is received as a command from the SRC to read out information, being identified by the register 138 of FIG. 4. The output of gate 208 is fed as an input to gate 212, whose other input is the zero output of a bistable device 214. The output of gate 212 is fed to a divider 216, which divides the timing pulses by 3, producing a 100 kHz output which is fed to clock TAU address counter 218 and, via channel 220 to clock all the address counters 222 (FIG. 8) of all the associated TAUs 44. When TAU address counter 218 has reached its maximum count, it produces an output at channel 224, enabling gate 226 and producing on channel 228 an output from divider 216 which resets to zero counter 218 and all the counters 222 of all the TAUs, thus maintaining counter 218 and all the counters 222 in synchronism. Individual stages of TAU address counter 218 are connected by channels 230 to the last stages of sync-address register 232, which contains permanently wired into its first stages the synchronizing signal and the POES address, so that if counter 218 is stopped at the reading corresponding to a particular TAU and shifting pulses are then applied to sync-address register 232, it will read out in sequence the synchronizing signal, the POES address, and the TAU address. To determine the conditions under which this will occur, it is necessary to consider FIG. 8.

As has been described, TAU address counter 222 is in synchronism with TAU address counter 218, receiving scan clock pulses via channel 220. The given TAU address counter 222 of each TAU has a single output channel 234, which is connected to a system of gates in 222 which are permanently connected to the various stages of counter 222 to produce an output on channel 234 when the count stored in 222 corresponds to the address of that particular TAU. Channel 234 is connected to enable gate 236 when this occurs, gating the scan clock pulse on channel 220 to change register 238. This is a single digit register connected via channel 100 to the sensing functions unit 88 of FIG. 4. When new data from 88 appear on channel 100, change register 238 is set to one; and when it is triggered by the output of gate 236, it produces an output on channel 240, being itself reset to zero in the process. If change register 238 has not been set to one by the entry of new data via channel 100, it will produce no signal output, and TAU address counter 218 of FIG. 7 will continue counting, the scan pulses on channel 220 will continue, and the output on channel 234 of TAU address counter 234 will cease. But if there has been new data entered via channel 100, change register 238 will product an output on channel 240. This will set bistable device 214, opening gate 212 and so stopping the TAU address counter 218, and stopping the appearance of scan clock pulses on channel 220, so that all TAU address counters 222 in each individual TAU will also be stopped. The "one" output of bistable device 214 will enable gate 242. The 300 kHz output of timing oscillator 206 is divided or counted down by a factor of 250 by divider 244, whose output now passes gate 242 and goes to gate 246. When gate 246 is open or uninhibited, these much slower shift pulses will appear on channel 248 and will appear at the gate 250 in each TAU. But each gate 250 is opened only by a signal on channel 234 of its TAU address counter 222, so that gate 250 will pass these shift pulses to data register 252 only if the count of the TAU register 222 corresponds to that particular TAU. When this occurs, the data which have entered data register via channel 100 will be shifted out on channel 240.

But before it is permissible for this to occur, the synchronizing signal, POES address, and TAU address stored in register 232 must be read out for transmission to the SRC. Shift register 254 of FIG. 7 has a capacity of at least as many bits as are comprised in the total word consisting of synchronizing signal, POES address, TAU address, and the capacity of data register 252. Initially at zero, it receives shift clock pulses from the output of gate 242. When its first stage changes to a one state as a result of such pulsing, it produces on output 256 a signal which sets bistable device 258, whose resulting output on channel 260 inhibits gate 246 and opens gate 262, which then transmits shifting pulses from gate 242 to register 232, which responsively thereto reads out its content of synchronizing signal, POES address, and TAU address via channel 264 to "or" gate or buffer 266, which transmits these via intermediate frequency modulator 267 and channel 268 for transmission to the SRC. Intermediate frequency modulator 267 modulates these signals on an intermediate frequency dedicated to communication to the SRC, via the permanent connection of RC 46 to an up converter 38 as represented in FIG. 2. When the proper number of shift pulses to complete this has occurred, shift counter 254 will have been filled with ones sufficiently far to produce an output on channel 270, which resets bistable device 258, causing the signal on channel 260 to cease, opening gate 262 and removing the inhibition on gate 246. Gate 246 now being open, shift pulses can appear on channel 248, causing that data register 252 whose gate 250 is held open by a signal on channel 234 of its TAU address counter 222 to be pulsed to read out its contents onto channel 240. These data signals pass to buffer 266 and are transmitted via channel 268 to the SRC.

When the register 252 which is being read out has been completely read out, shift counter 254 will be filled with ones to its final stage. It then produces a reset signal which via channel 272 resets bistable device 214, which responsively thereto opens gate 242, stopping the shift pulses, and opens gate 212, again starting the feeding of scan clock pulses to TAU address counter 218 and, via channel 220, to all the TAU address counters 222 of all the associated TAUs.

The stepping of TAU address counter 218 continues until it reaches its maximum count, when it produces an output on channel 224, opening gate 226 and producing a reset pulse on channel 228, which resets to zero TAU address counter 218 and all the TAU address counters 222. Thus the scanning cycle is ready to begin again, and continue so long as the enabling signal appears on channel 160.

The somewhat elaborate provision of scan clock of comparatively high frequency on channel 220 and a much lower shift pulse or clock frequency on channel 248 is primarily economic, permitting scanning to occur at a speed higher than it is economical to provide in the data registers.

While RC 46 has been described as communicating with the SRC 20 by certain satellite channels dedicated exclusively to such use, this is merely an economical use of communication channels which can readily be provided. It is not essential to the operation of my invention that this be done; completely ground-based channels between RC 46 and SRC 20 are perfectly usable, if available.

System routing controller SRC 20 is a computer whose required functions are all known to the existing computer art. The particular manner of providing these capabilities is a part of the normal skills of the computer art. Thus a general description of the tasks of SRC 20 is appropriate, rather than a description of a particular computer design.

SRC 20 has a store capable of containing, inter alia, information on the current assignment of each channel in the satellite's relay system, and of each IF channel in a given POES for communication between two TAU's in that POES; and it also stores information on the current status of every TAU in the system. Upon receiving vai RC46 a demand for assignment of transmitting and receiving channels to communicate with another TAU identified in the demand message, it alters its store to record that the calling TAU is in use, determines by reference to its store that the called TAU is not in use, and then assigns appropriate unused channels to the call, and transmits to the RC's of the calling and of the called TAU messages directing the TAU's to occupy these channels. If the called TAU is in use, the SRC directs to the called TAU, via its RC, a message appropriately addressed, directing the TAU to connect a "busy" signal to its associated access line. If the called TAU was not busy, when the two TAU's have occupied their assigned channels, ringing signal is applied by the called TAU to its access line. When the called party replies, a signal indicative of this fact is transmitted by the called TAU, via its RC, to the SRC, which enters this fact in its store. To summarize, every function which is commanded or signalled in a wire telephone system by signals appearing upon the wire line is converted into signals sent via the TAU and RC to the SRC; and the SRC, in addition to its assignment of frequency channels, transmits via RC and TAU signals which command appropriate actions, such as transmitting ringing current or a ringing or busy signal from local generators. These are all information processing actions performable by known techniques; and, except for the assignment of frequency channels, are performed somewhat similarly in existing telephone systems employing carrier equipment. It should be noted that, while speed and economy would dictate the use of computer type equipment, in theory at least the functions of the SRC could be performed by an admittedly large number of human operators.

What is claimed is:

1. A primary office earth station comprising a. directive antenna means connected to b. transmitter means to amplify without frequency change and transmit to the directive antenna means a plurality of modulated signals separated from each other in frequency but all lying within the transmission band of the transmitter means, which plurality it receives from c. transmitting frequency converter means to receive the said modulated signals at separated intermediate frequencies lying within a common intermediate frequency band and to translate them in frequency to lie within the transmission band of the transmitter means;

d. a plurality of transmitting intermediate frequency means each connected to receive signals from an access line and to convert them to a modulated signal at one of the said separated intermediate frequencies, and to transmit the said modulated signal to the transmitting frequency converter means and to receiving intermediate frequency means, comprising:

1. modulator means;
2. controllably programmable oscillator means programmable by control signals to oscillate at a frequency effective to produce the said modulated signal at an intermediate frequency determined by the said control signals;
3. controllable switching means controllable by control signals to selectively connect the transmitting intermediate frequency means to the transmitting frequency converter means and to a plurality of receiving intermediate frequency means;

e. receiver means to receive from the directive antenna means a plurality of modulated signals separated in frequency but lying within the transmission band of the receiver means, amplify them without frequency change, and transmit them to f. receiving frequency converter means to receive the said modulated signals and translate them to lie within the intermediate frequency band, and transmit them to g. a plurality of receiving intermediate frequency means each connected to receive separated modulated signals in the common intermediate frequency band from receiving frequency converter means and from a plurality of transmitting intermediate frequency means and to demodulate a separated modulated signal and transmit the demodulated signal to an access line, comprising:

1. demodulator means;
2. controllably programmable oscillator means programmable by control signals to oscillate at a frequency effective to cause the demodulator means to demodulate a signal at an intermediate frequency determined by the said control signals;
3. controllable switching means controllable by control signals to selectively connect the receiving intermediate frequency means to the receiving frequency converter means and to a plurality of transmitting intermediate frequency means;

h. a plurality of supervision and control means, one of which is uniquely associated with each access line, a transmitting intermediate frequency means and a receiving intermediate frequency means being also uniquely associated with said access line, comprising:

1. address means permanently connected to gate signals from the routing controller which include identification of the access line to
2. means to receive coded signals thus gated and, responsively thereto, to generate oscillator control signals to control the frequency of the controllably adjustable oscillator means of the transmitting intermediate frequency means associated with the said access line and the controllably adjustable oscillator means of the receiving frequency means associated with the said access line, and to control the controllable switching means of the same transmitting intermediate frequency means and to control the controllable switching means of the same receiving frequency means; and to transmit to the access line functional signals reresented by the said coded signals;
3. means to receive coded signals representing functional information from the access line and to transmit them to the routing controller;

i. routing controller means comprising:

1. means to receive the said coded signals recited in *h*)3) and to transmit them to
2. controller transmitting intermediate frequency means permanently connected to said transmitting frequency converter means, and adapted to receive coded signals and produce signals in a fixed intermediate transmitting frequency modulated to represent the said coded signals;

3. supplemental identification signal means to produce coded signals supplementary to the said coded signals recited in *i*)3) and to transmit them to the said controller transmitting intermediate frequency means;

4. controller receiving intermediate frequency means permanently connected to said receiving frequency converter means, and adapted to receive therefrom signals at a fixed intermediate receiving frequency modulated to represent coded signals and to demodulate them to produce the said coded signals, and connected to transmit them to the function table and storage and shift register means recited in *i*)2).

2. The method of switching a plurality of access lines to each other and to satellite rely channels which comprises in combination:

1. converting the signal from a first said access line to a first selected intermediate frequency lower than the frequency of a satellite relay channel;
2. connecting the said first intermediate frequency signals to a frequency converter to change them to a first satellite relay channel frequency for relay by the satellite and
3. transmitting the said first intermediate frequency signals to an intermediate frequency demodulator tuned to the said first intermediate frequency and connected to a second said access line for transmission of the said signals from the first said access line to the second said access line;
4. converting signal from the second said access line to a second selected intermediate frequency lower than the frequency of a satellite relay channel and different from the said first selected intermediate frequency;
5. connecting the said second intermediate frequency signals to a frequency converter to change them to a second satellite relay channel frequency for relay by the satellite and
6. transmitting the said second intermediate frequency signals to an intermediate frequency demodulator tuned to the said second intermediate frequency and connected to the first said access line for transmission of the said signals from the said second access line to the first said access line;
7. converting signals at a satellite relay channel frequency to intermediate frequency signals and transmitting the said intermediate frequency signals to an intermediate frequency demodulator tuned to the said signals and connected to the said first access line for transmission of the said signals, after demodulation, to the said first access line; and
8. converting signals at a satellite relay channel frequency to intermediate frequency signals and transmitting the said intermediate frequency signals to an intermediate frequency demodulator tuned to the said signals and connected to the said second access line for transmission of the said signals, after demodulation, to the said second access line.

3. The method claimed in claim 2 in which a plurality of intermediate frequency signals are transmitted via a common channel to a plurality of intermediate frequency demodulators.

* * * * *